(12) United States Patent
Jenko et al.

(10) Patent No.: US 6,315,549 B1
(45) Date of Patent: Nov. 13, 2001

(54) HOT TIP INSULATOR RETAINER

(75) Inventors: Edward J. Jenko, Essex Junction; Fadi Fikani, Burlington; Scott W. Molnar, Alburg; Matthew T. Therrien, Essex Junction; Stefan von Buren, Colchester; Thom A. Smith, Fairfax, all of VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/272,251

(22) Filed: Mar. 19, 1999

(51) Int. Cl.[7] .................................................. B29C 45/20
(52) U.S. Cl. .......................................... 425/549; 425/564
(58) Field of Search .................................. 425/549, 562, 425/563, 564, 565, 566

(56) References Cited

U.S. PATENT DOCUMENTS

| | | | |
|---|---|---|---|
| 5,429,491 | * 7/1995 | Gellert | 425/549 |
| 5,895,669 | * 4/1999 | Seres, Jr. et al. | 425/549 |
| 6,062,840 | * 5/2000 | Lee et al. | 425/130 |

* cited by examiner

Primary Examiner—Tim Heitbrink
(74) Attorney, Agent, or Firm—Katten Muchin Zavis

(57) ABSTRACT

An injection molding nozzle tip thermal insulator includes an apparatus for removably fastening the insulator to a nozzle tip having a receiving detent therein. The apparatus includes a fastening structure that engages the nozzle tip receiving detent and holds the insulator onto the nozzle tip. The fastening structure is movable between a first position where the insulator is fastened to the nozzle tip, and a second position where the insulator is removable from the nozzle tip. Also included are a method of removably attaching the insulator to the nozzle tip, and assembly and removal tools for attaching and removing the insulator from the nozzle tip, respectively.

25 Claims, 16 Drawing Sheets

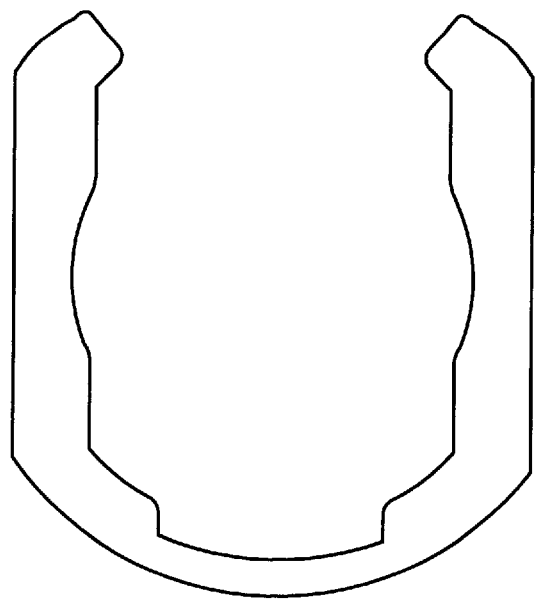
FIG. 5D'    FIG. 5D"
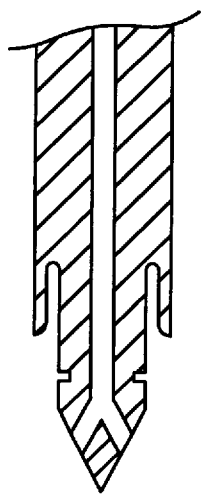
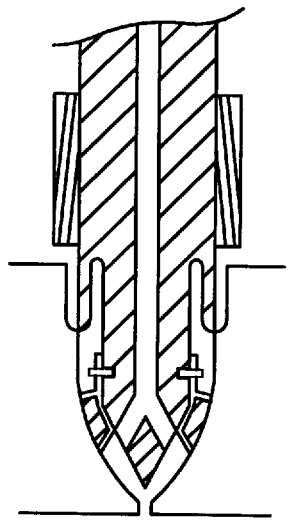
FIG. 5E    FIG. 5F

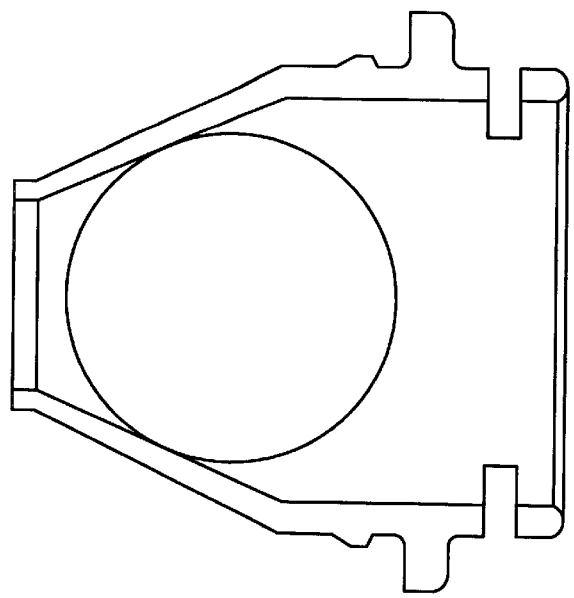
FIG. 6B'
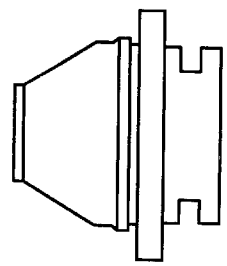
FIG. 6B''
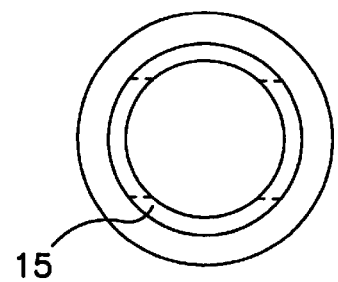
FIG. 6B'''
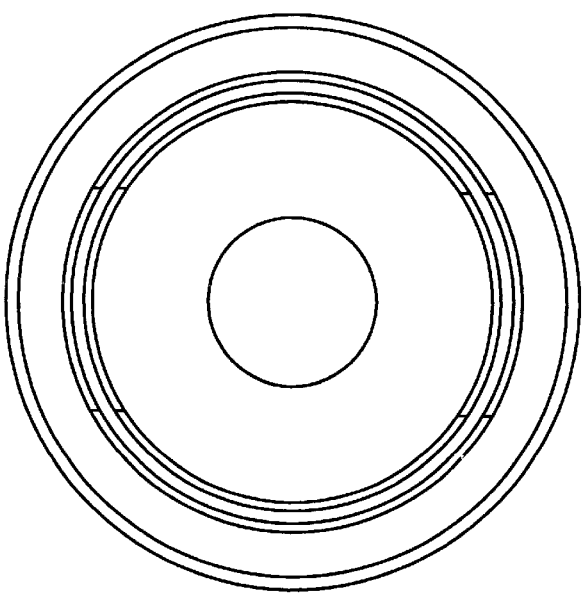
FIG. 6B''''

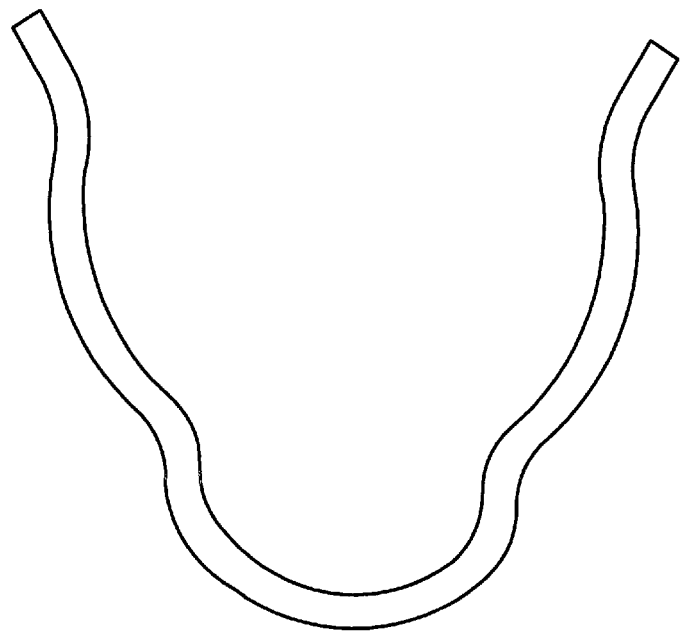
FIG. 9A
 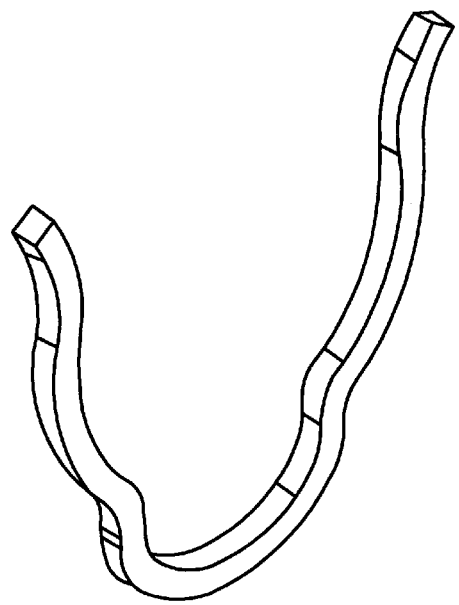
FIG. 9B          FIG. 9C

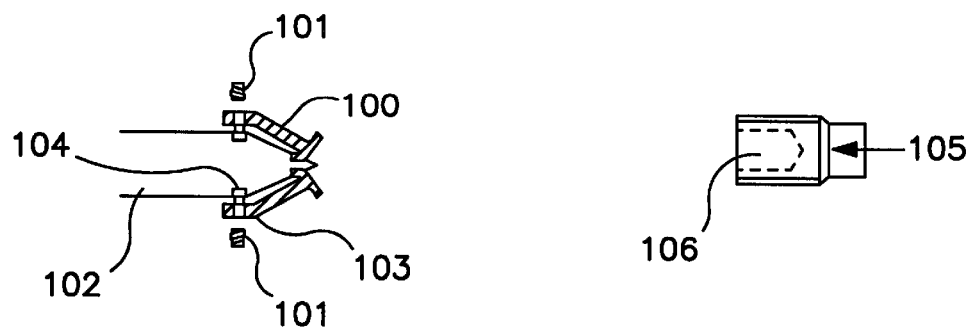
FIG. 10A
FIG. 10B
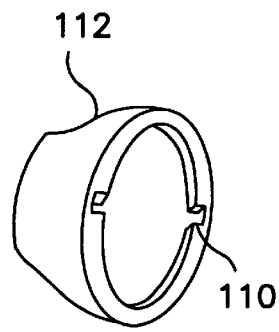
FIG. 11A
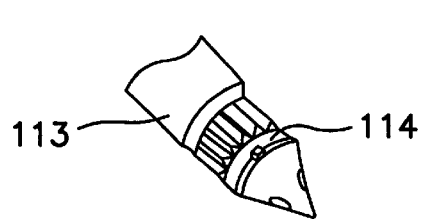
FIG. 11B
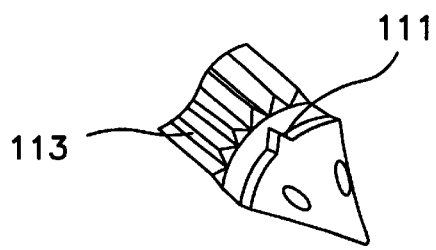
FIG. 11C

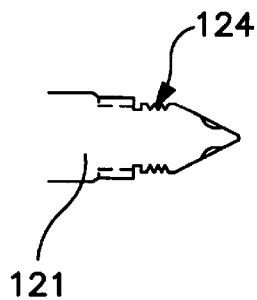 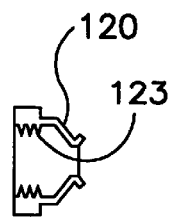 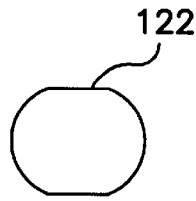
FIG. 12A     FIG. 12B     FIG. 12C
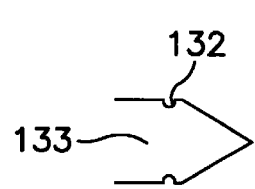 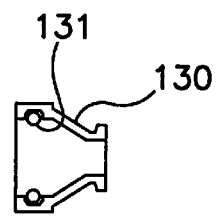 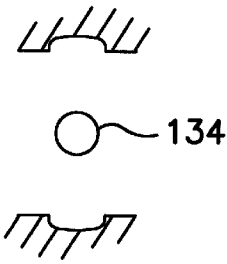
FIG. 13A     FIG. 13B     FIG. 13C
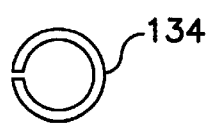 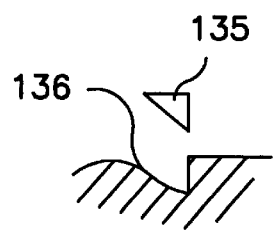
FIG. 13D     FIG. 13E

HOT TIP INSULATOR RETAINER

BACKGROUND OF THE INVENTION

1. Field of the Invention

The present invention relates to the field of injection molding. More particularly, the invention relates to an insulator that covers part of the exterior of a hot runner nozzle, or to the nozzle tip on the end of the injection molding machine injection unit. The insulator is held onto the nozzle or nozzle tip by a removable fastening structure.

2. Description of the Related Art

Insulators are used to thermally insulate the heated tip or nozzle housing of a hot runner nozzle assembly from the surrounding cooled gate insert of a mold cavity. U.S. Pat. No. 4,662,837 to Anderson (incorporated herein by reference) shows such an insulator assembly. FIGS. 3–5 inclusive show an insulator assembly comprising two elements 41 and 42 that thermally insulate the housing end 15 from the gate insert 20. The insulators are typically made of a high temperature resistant, resilient material such as "Vespel". The insulators occupy the space that would otherwise be filled with a resin "bubble", well known in the art. If the resin being processed tends to degrade over time and it is allowed to form the insulating bubble around the tip the degraded resin eventually is drawn into each part being molded causing unsatisfactory properties and appearance. It is therefore essential that the insulating function of the bubble be performed by some material other than the resin being processed if it is thermally sensitive or if plastics of differing colors are to be processed and errant color streaks are undesirable.

The insulators in the '837 patent are not fastened to the housing and when the housing is separated from the gate insert they could remain in the insert 20. The insulators must then be removed for cleaning or replacement prior to reassembly of the housing, and this removal can be time consuming and problematic because it requires dismantling the mold. This process is not conducive to making repairs in a production environment.

U.S. Pat. No. 5,208,052 to Schmidt et al. (incorporated herein by reference) shows another insulator construction that surrounds a heated tip of a hot runner nozzle assembly. FIG. 2 shows insulator 32 surrounding tip 31 and extending toward the gate sufficiently to displace most of the bubble in the gate area. The insulator 32 is made of titanium and separated from both the tip 31 and cooled gate area 22 by air gaps on either side. The insulator is threaded onto the nozzle housing 30 and retains tip 31 in said housing by means of the contact area 50. The tip must seal against the bubble wall to prevent resin leaking behind it and occupying the air gap space. Sealing is effected by seal 34 in combination with deflection of the insulator leg pressing between the tip at 50 and the bubble wall. This design has the disadvantage of being relatively costly and titanium is not as effective as a thermal insulator as "Vespel".

U.S. Pat. No. 5,639,490 to Travaglini is an example of a means to prevent a hot runner nozzle tip from loosening while in operation. An axially elongated bridging key arrangement is used to lock the nozzle tip to the nozzle housing.

Co-pending U.S. application Ser. No. 09/170,054 to Jenko (incorporated herein by reference) shows a two piece insulator that surrounds the tip. An inner titanium sleeve is surrounded by an outer "Vespel" sleeve and the assembly is slid over the tip and held in place by the bubble shape in the gate area. Releasably fastening the insulator to the tip is not taught.

It is therefore desirable to have an effective thermal insulator that can be easily attached and removed from the nozzle tip to facilitate ease of maintenance during production operations.

SUMMARY OF THE INVENTION

It is an object of the invention to create a fastening structure for removably fastening an insulator to a nozzle tip, in order to overcome the drawbacks of conventional methods of attaching insulators to nozzles and nozzle tips.

To this end, one aspect of the present invention comprises an apparatus for removably fastening an insulator to an injection molding nozzle tip that has a receiving detent. The fastening structure engages the nozzle tip receiving detent and holds the insulator onto the nozzle tip. The fastening structure may be moved between a first position where the insulator is fastened to the nozzle tip, and a second position where the insulator is removable from the nozzle tip.

In another aspect of the present invention, a fastening device for removably attaching an insulator to an injection molding nozzle tip comprises an engaging structure and a fastening structure removably coupleable to the engaging structure.

According to another aspect of the present invention, an insulator device for an injection molding nozzle tip comprises an insulator for thermally insulating the nozzle tip, and a coupling structure for removably attaching the insulator to the nozzle tip.

Yet another aspect of the present invention is directed to an injection molding device that comprises a mold having an opening and a nozzle assembly for contacting the opening. The nozzle assembly further comprises a nozzle tip through which molten material passes and a nozzle tip insulator for thermally insulating the nozzle tip. The insulator includes a coupling structure for removably coupling the insulator to the nozzle tip.

A further aspect of the present invention is directed toward providing a method of removably attaching an insulator to an injection molding nozzle tip. The method comprises the steps of placing an insulator over the nozzle tip and biasing an engaging structure to cause the insulator to become removably coupled to the nozzle tip.

Another aspect of the present invention is directed to an assembly tool for attaching an insulator to an injection molding nozzle tip. The assembly tool comprises a retaining structure for holding the insulator, and a deflecting structure for attaching the insulator to the nozzle tip. The deflecting structure deflects a coupling structure in the insulator, positions the coupling structure in the insulator over a nozzle tip receiving detent corresponding to the coupling structure, and releases the coupling structure in the insulator, causing the coupling structure in the insulator to become removably attached to the nozzle tip receiving detent.

An additional aspect of the present invention is directed to a removal tool for removing an insulator from an injection molding nozzle tip. The removal tool comprises a retaining structure for holding the insulator, and a deflecting structure for removing the insulator, where the deflecting structure deflects a coupling structure in the insulator, detaching the coupling structure in the insulator from a nozzle tip receiving detent corresponding to the coupling structure, thereby releasing the insulator from the nozzle tip.

The invention is described in more detail below with reference to the accompanying drawings.

BRIEF DESCRIPTION OF THE DRAWINGS

FIGS. 5d' and 5d" comprise [FIG. 5d is a] plan and cross-sectional views of a retaining clip for Version "B".

FIG. 5e is a cross-sectional view of a one piece nozzle housing for retaining clip version "B", without an attached insulator.

FIG. 5f is a cross-sectional view of a one piece nozzle housing assembly with retaining clip version "B", showing the attached insulator.

FIGS. 6b', 6B", 6b''', and 6b'''' comprise plan and cross-sectional views of a titanium insulator (inner sleeve) for version "B".

FIGS. 9a–9c are cross-sectional and three-dimensional views of a square-sectioned retaining clip version "B".

FIGS. 10a–10b are cross-sectional views of an alternate set screw embodiment, showing the socket used to tighten the set screws.

FIGS. 11a–11c are three-dimensional views of an alternate bayonet embodiment, showing the insulator and nozzle tip.

FIGS. 12a–12c are cross-sectional views of an alternate thread and flats embodiment, showing the insulator, nozzle tip, and flats.

FIGS. 13a–13e are cross-sectional views of an alternate snap ring embodiment, showing the insulator, nozzle tip, and snap rings.

DESCRIPTION OF THE PREFERRED EMBODIMENTS

Figure 1A:
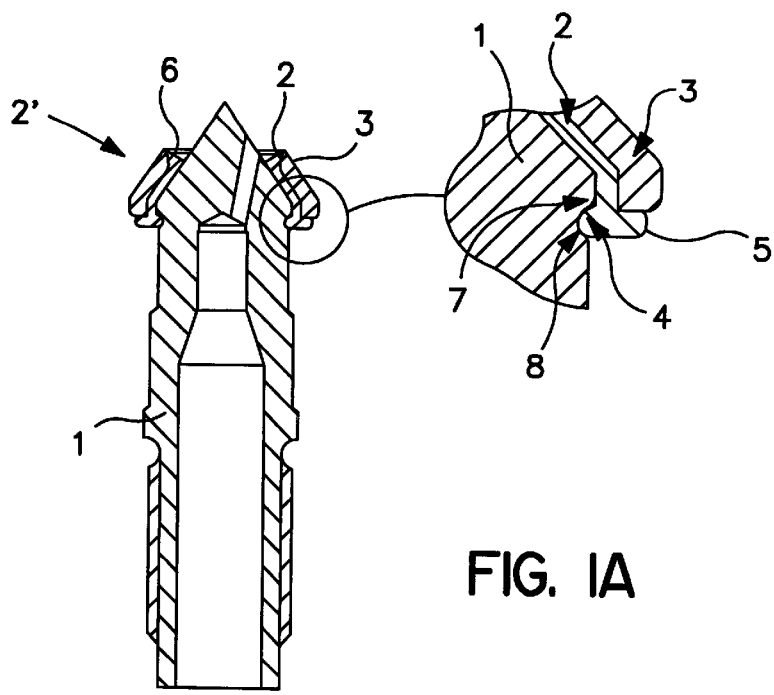
FIG. 1a is a cross-sectional view of a "Snap On" insulator assembly including a nozzle tip insulated by an insulator.

The first embodiment of the invention will be described with reference to FIGS. 1a–1d. These figures show an improvement of the two piece insulator disclosed in co-pending U.S. application Ser. No. 09/170,054, wherein the improvement consists of a "snap-on" detent feature on the inner piece that allows the insulator to be removably attached to the tip. FIG. 1a shows a hot runner tip 1 having an insulator assembly 2' comprising an inner piece 2 and an outer piece 3 attached thereto. The outer piece is held in place on the inner piece by a shoulder 5 and a lip 6. The insulator assembly is "snapped" onto the tip by deflecting the inner piece's flange 4 over the protruding lip 7 of the hot runner tip so that the flange 4 moves into groove 8 machined on the tip.

Figure 1B:
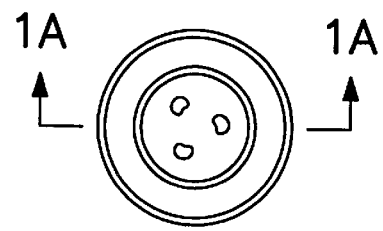
FIGS. 1b–1d are three-dimensional views of the nozzle tip and attached insulator.
Figure 1C:
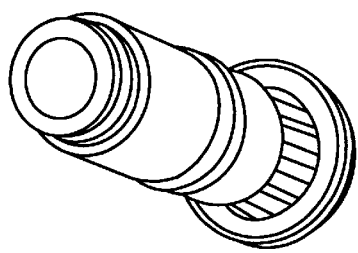
Figure 1D:
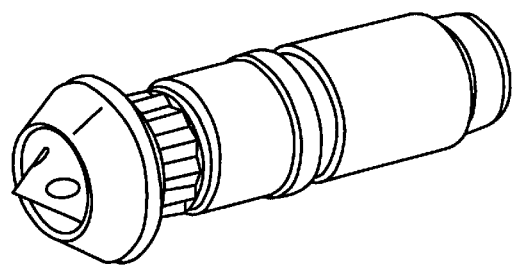

FIGS. 1b–1d are additional three-dimensional views of the nozzle tip with the insulator removably attached thereon. The inner piece is a conductive material capable of withstanding high temperatures without deforming, cracking, or otherwise deteriorating. The preferred material for the inner piece may be, or include, titanium. The outer piece is an insulating material that is also capable of withstanding high temperatures without deforming, cracking, or otherwise deteriorating. The preferred material for the outer piece may be, or include, Vespel. An alternate version of this insulator style, not shown, is a one-piece insulator made of or including an elastic, heat-resistant material such as Vespel comprising both the inner and outer shapes into one item having the same external dimensions as the two-piece insulator it replaces. The one-piece insulator is attached to the tip 1 in the same fashion, i.e. "snapping" over the flange 7 into groove 8.

It is to be understood that in the context of the present invention, the term nozzle or nozzle tip may be used interchangeably, and may refer to either of a nozzle tip for a hot runner application, or a nozzle tip on the end of an injection molding machine's injection unit that is coupled to a mold sprue bushing. Insulators that can be removably attached to either type of injection molding nozzle tip are considered useful and within the scope of the present invention, which should not be limited to one application or the other.

Figure 14:
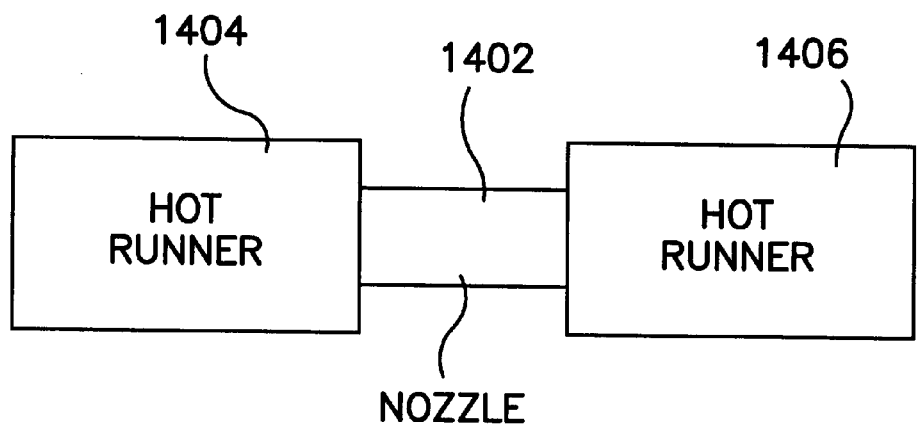
FIG. 14 is a schematic block diagram showing first and second hot runner units connected by a nozzle.

It is to be further understood that the present invention should not be limited only to the use of hot runner nozzles with molds. The present invention includes the use of hot runner nozzles that are installed as extensions between machine injection units and inlets to mold hot runners, which are outside the mold structure. As shown in the block diagram of FIG. 14, the hot runner nozzle tip 1402 may form a connection between hot runner structures 1404, 1406, or between an injection machine nozzle and a heating channel for conveying melted materials. Insulators that can be removably attached to hot runner nozzle tips used in any setting are considered useful and within the scope of the present invention, which should not be limited to the use of hot runner nozzles with molds.

An assembly tool for use with the insulator shown in FIGS. 1a–1d and described above is illustrated in FIGS. 2a–2d. The assembly tool aids with the assembly of the insulator and nozzle tip using the "snapping" action of the first embodiment. The assembly tool 20 is designed to securely hold the insulator 2 while properly positioning the insulator over the hot runner nozzle tip 1 in order to releasably attach it to the nozzle tip. Pressure is applied to the assembly tool 20 in a direction parallel to and toward the nozzle tip, causing the flange 4 of the insulator to deflect over the protruding lip 7 of the hot runner nozzle tip, moving the flange 4 into the groove 8 on the nozzle tip, causing the insulator to become releasably attached to the nozzle tip.

Although it is possible to attach the insulator of the present invention to the nozzle tip without the use of an assembly tool, it is advantageous to use the tool of FIGS. 2a–2d to attach the insulator so that it is applied to the hot runner nozzle tip in such a way that a proper attachment is formed without placing unnecessary pressure on the tip, which may cause damage, and without causing excessive wearing of the flange 4, protruding lip 7, and groove 8. Thus, the functional life of both the nozzle tip and the insulator are extended by use of an assembly tool.

The assembly tool is preferably made of a material that can be machined to fit the dimensions of the nozzle tip and insulator while remaining strong and durable for repeated use in attaching insulators to tips that may or may not be at an elevated temperature. Such materials may include, but are not limited to, metal (such as steel), heat-resistant plastic, and fiberglass.

A disassembly or removal tool for use with the insulator shown in FIGS. 1a–1d and described above is illustrated in FIGS. 3a–3d. To aid with the disassembly of this "snapping" action releasable attachment, a removal tool 30 is used. The disassembly tool 30 is designed to securely hold the insulator 2 while deflecting arms 31 are positioned under the insulator. When pressure is applied to the disassembly tool 30 in a direction parallel to and away from the inujection molding nozzle tip, the deflecting arms 31 cause the flange 4 of the insulator to be pulled out of the groove 8 and over the protruding lip 7 on the nozzle tip, causing the releasably attached insulator to become unattached from the nozzle tip, allowing easy removal.

Although it is possible to remove the insulator from the nozzle tip without the use of a removal tool, it is advantageous to use the tool of FIGS. 3a–3d to remove the insulator so that the insulator is removed in such a way that no damage or excessive wearing of any of the nozzle tip, the insulator, or the snap-on attachment assembly occurs. Use of the disassembly tool helps to extend the functional life of both the nozzle tip and the insulator.

The disassembly tool is preferably made of a material that can be machined to fit the dimensions of the nozzle tip and insulator while remaining strong and durable for repeated use in removing insulators from tips that may or may not be at an elevated temperature. Such materials may include, but are not limited to, metal (such as steel), plastic, and fiberglass.

As shown in a second embodiment illustrated in FIGS. 4a–4d, a two-piece Vespel and titanium insulator 41 is releasably attached to the tip 43 by an end-acting clip 42. The clip 42 attaches the insulator 41 to the tip 43 by snapping over the end of the insulator assembly into a groove 44 in the tip. The clip 42 has a "U" or semicircular shape, and clip 42 has a flange 45 that engages a groove 47 in the insulator, and another flange 46 that engages the groove 44 in the tip. The clip 42 is designed to engage the groove 44 in the tip and the groove 47 in the insulator tip by being pushed toward the tip and insulator in a direction transverse to the tip's centerline. The insulator is removed by pulling the clip out of the two grooves, 44 and 47, simultaneously. As described above, the two-piece insulator assembly can also be made of a single piece comprising one material, such as Vespel. The clip 42 may be made of a material that retains its resilience after being repeatedly subjected to elevated temperatures in the range of 450–700° F. Such materials include, but are not limited to, spring steel and stainless steel.

The third and most preferred embodiment is illustrated in FIGS. 5a–5f, and encompasses a two-piece Vespel and titanium "Hot Tip" insulator that is releasably attached to the nozzle tip by a through-acting clip.

Figure 5A:
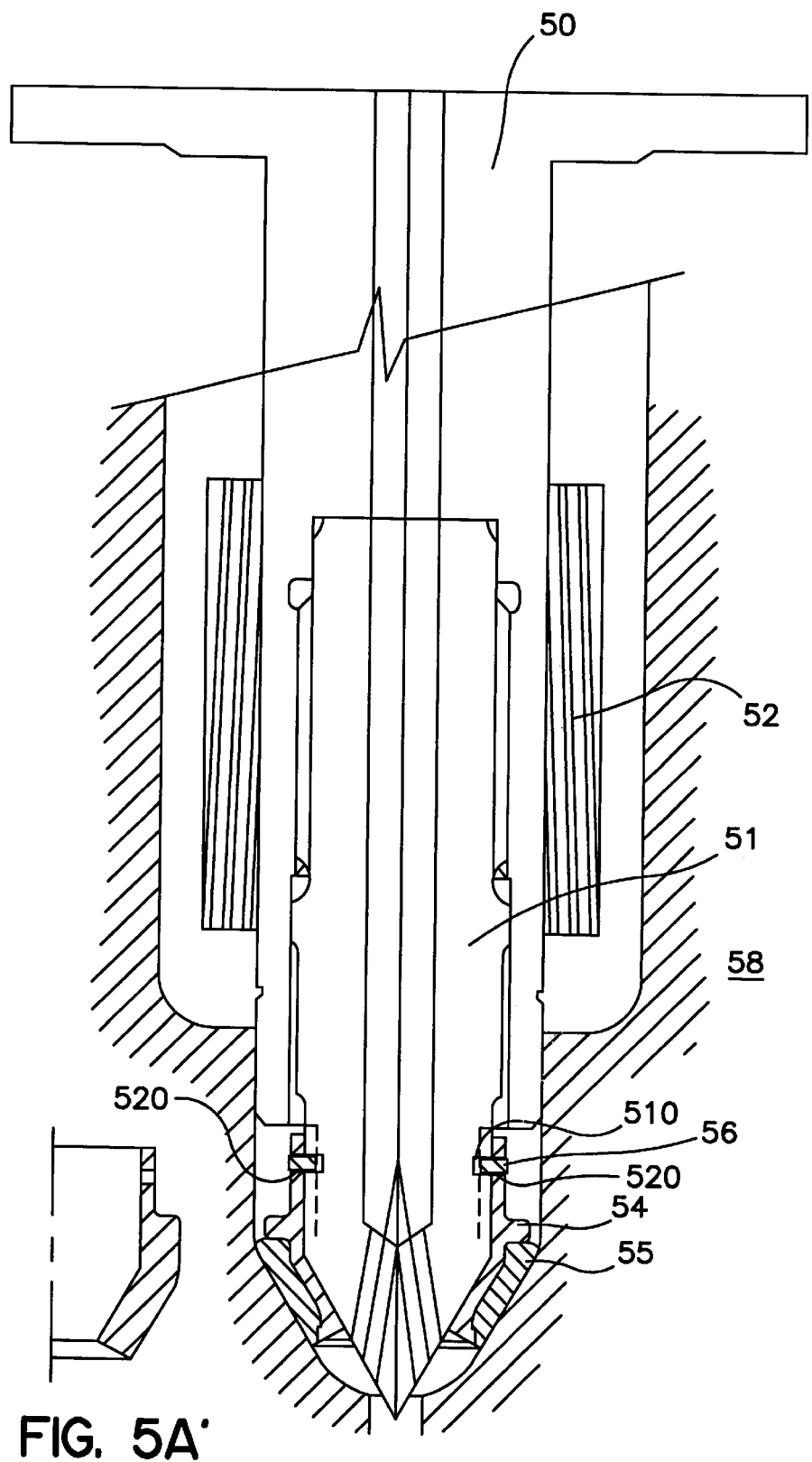
FIGS. 5a and 5a' comprise cross-sectional views of a hot tip nozzle assembly with retaining clip version "B".

FIG. 5a shows cross-sectional view of a "Hot Tip" nozzle assembly comprising nozzle housing 50, into which is threaded a nozzle tip 51. A heater 52 is clamped to the outside of the housing. The tip 51 is thermally insulated from the cooled mold plate 53 by a nozzle tip insulating assembly comprising an inner titanium sleeve 54, and an outer Vespel sleeve 55, that is removably fastened to the tip 51 by retaining clip 56. The inner sleeve may be comprised of any conducting material capable of withstanding elevated temperatures without deforming, such as titanium. The outer sleeve may be comprised of any insulating material that is capable of withstanding elevated temperatures without deforming, such as Vespel. The retaining clip design of the preferred embodiment is simpler than the clip shown in the embodiment of FIGS. 4a–4d. The clip 56 slides transversely into a groove and/or slot that is common to both the tip and the insulator.

As can be seen in the cross-section shown in FIG. 5a, injection molding nozzle tip 51 has a groove 510. The titanium inner piece 54 of the insulator has two partially circumferential slots 520 through which the clip 56 is pressed so as to engage groove 510, thereby fastening the titanium inner sleeve 54 and attached Vespel outer sleeve 55 to the tip 51. Removal is accomplished by pressing the clip out of the groove/slot combination. Application or removal of the clip can be easily accomplished by using one hand, making the installation or removal of the insulator very convenient. Note that the clip is located in an area of the assembly not touched by the plastic being processed, which allows the insulator to be removed without having to clean off the tip, thus increasing efficiency. The insulator can alternatively be made of one piece of material, as shown in the inset, and still utilize the same attachment means described above.

Figure 5B:
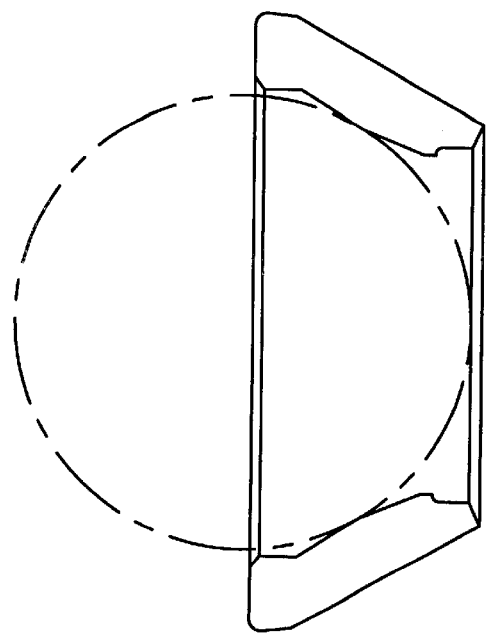
FIG. 5b is a cross-sectional view of a Vespel insulator (outer sleeve) for a version "B" retaining clip.
Figure 5C:
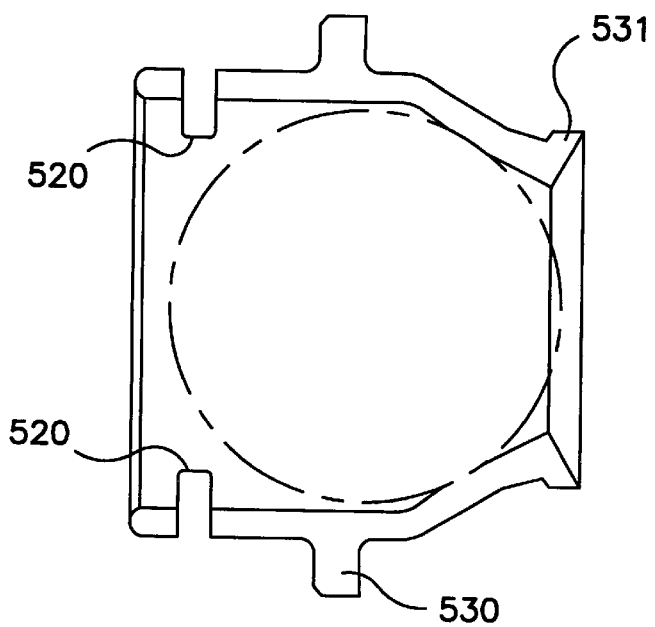
FIG. 5c is a cross-sectional view of a titanium insulator (inner sleeve) for a version "B" retaining clip.

The third and preferred embodiment is further described in FIGS. 5b and 5c, which show one method of attaching the outer piece shown in FIG. 5b (55 in FIG. 5a) to the inner piece shown in FIG. 5c (54 in FIG. 5a). The inner and outer pieces are attached by trapping the outer piece between shoulder 530 and flange 531, shown in FIG. 5c. The outer piece is comprised of a material that is able to deflect as it passes over flange 531, allowing it to abut against shoulder 530, then returning to its original shape so that it is held in place on the inner piece by flange 531. FIG. 5c also shows additional details of the inner piece and the slots 520 cut through its upper wall.

FIGS. 5d' and 5d" show the flat clip that fits through the slots 520 in the inner piece S4 and simultaneously engages the retaining groove 510 in the nozzle tip 51, as shown in FIG. 5a.

FIG. 5e shows an alternate construction of the third and preferred embodiment where a one-piece hot tip nozzle housing is used. In this alternative, the tip and the housing are made of the same material, and are formed as a single piece. The combination of the one-piece hot tip nozzle housing and the insulator attachment is shown in FIG. 5f, which depicts the use of the through-acting clip as a retaining means, as described above in FIG. 5a.

Figure 6A:
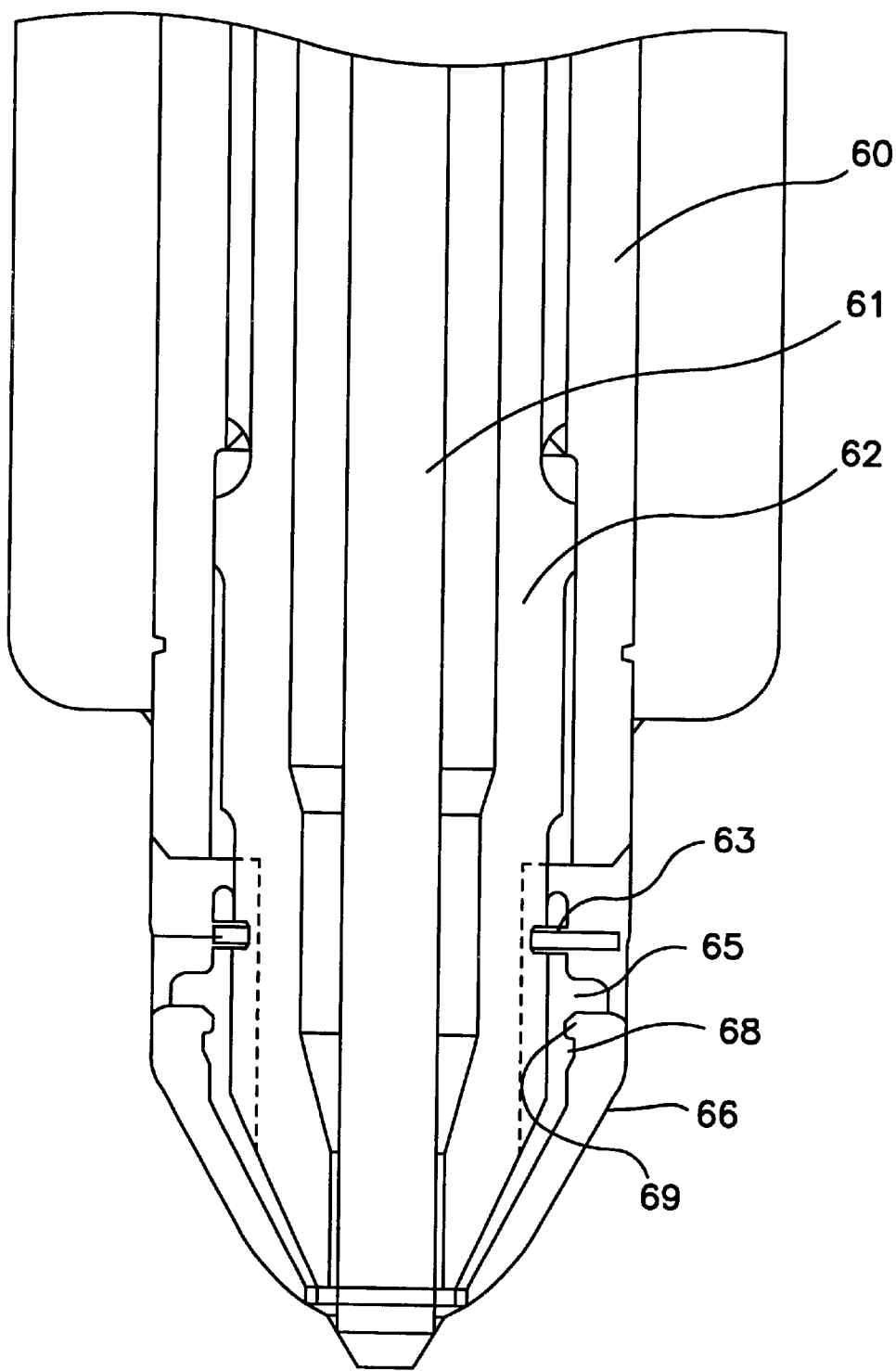
FIG. 6a is a cross-sectional view of a valve gate nozzle assembly and insulator with retaining clip version "B".
Figure 6C:
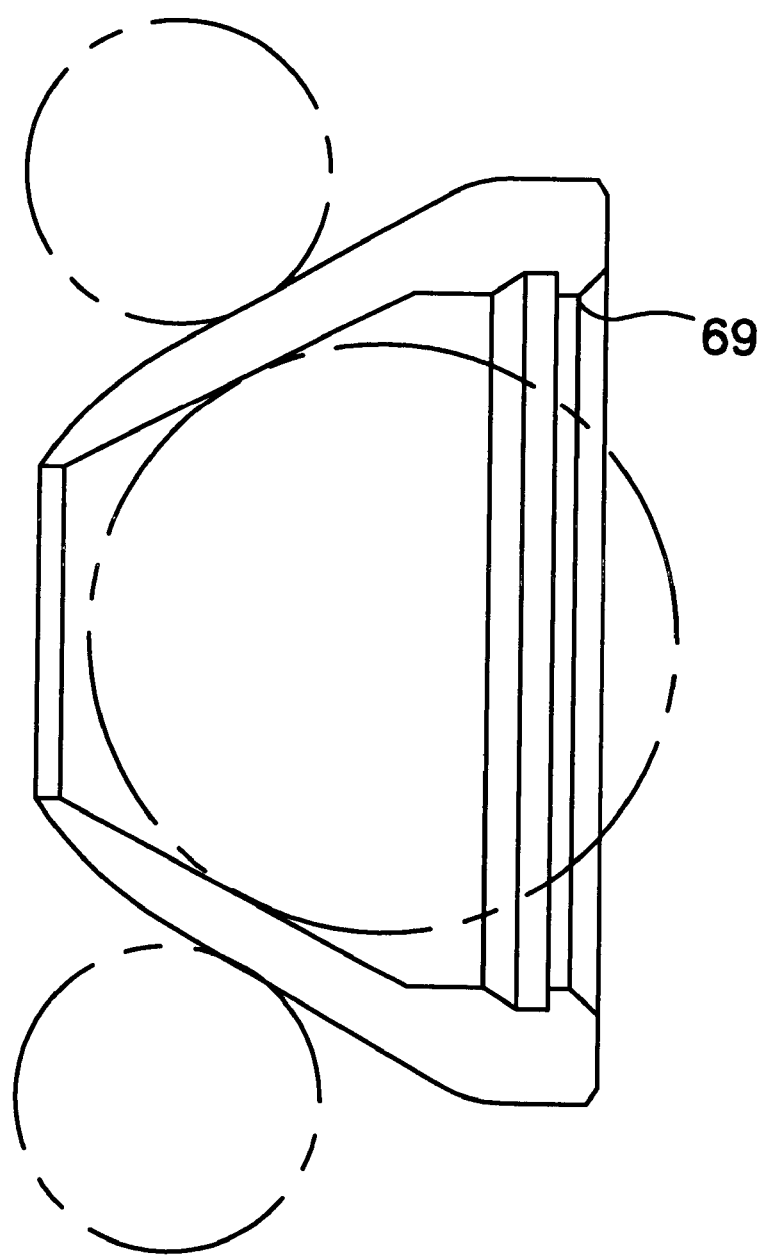
FIG. 6c is a cross-sectional view of a Vespel insulator (outer sleeve) for version "B".
Figure 7A:
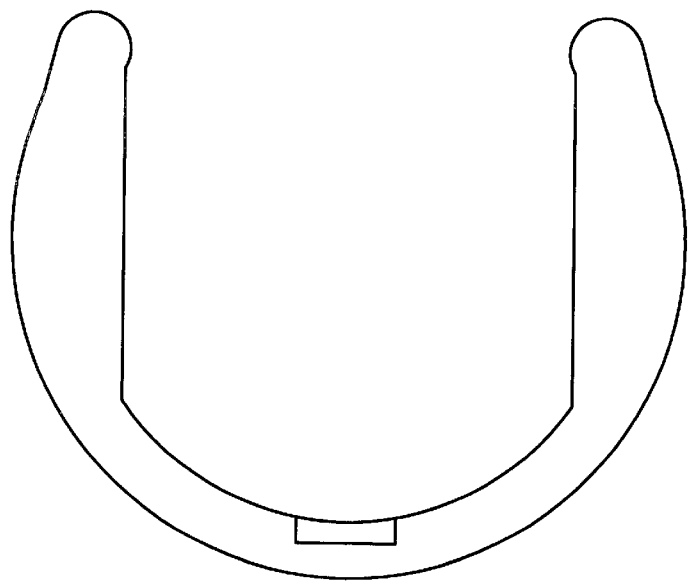
FIGS. 7a–7c are cross-sectional and three-dimensional views of a flat retaining clip version "B".
Figures 7B, 7C:
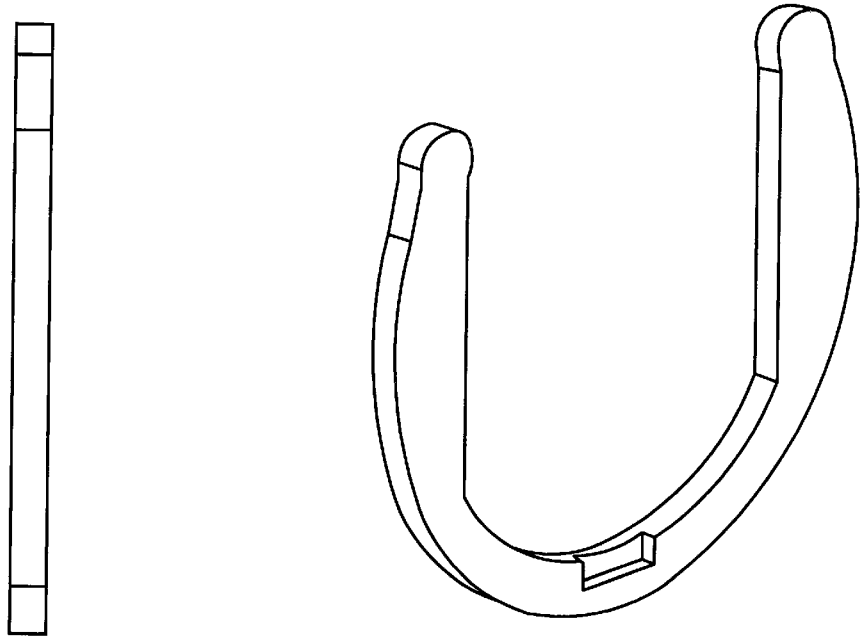
Figure 8A:
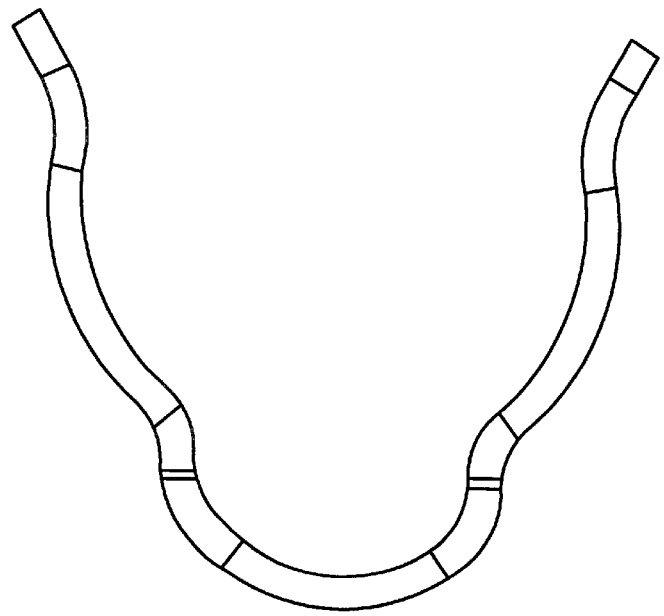
FIGS. 8a–8c are cross-sectional and three-dimensional views of a wire retaining clip version "B".
Figure 8B:
Figure 8C:
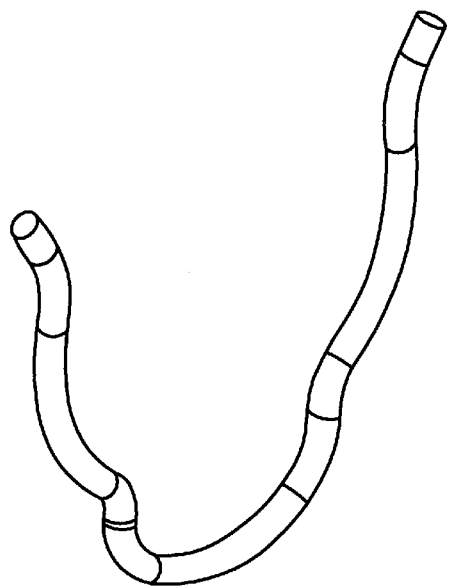

Another alternate version of the preferred embodiment is shown in FIGS. 6a–6c, which show a "Valve Gate" version. In FIG. 6a, tip 62 is threaded into the nozzle housing go and valve stem 61 passes through the center hole in the tip. The insulator design and retention means are the same as described above in FIG. 5a, with the exception that the method of attaching the outer sleeve 66 to the inner sleeve 65 is different from the Hot Tip version described in FIG. 5a above in that no flange is used at the lower end of the inner piece. Instead, as is shown in more detail in FIGS. 6b', 6b", 6b''', 6b'''' and 6c, a shoulder 69 on the outer piece 66 is able to deflect over a corresponding shoulder 68 on the inner piece 65, and then return to its original shape. The shoulders are located at the upper end of the insulator assembly, and the outer piece has a tapered bottom that extends up to the bottom of the inner piece of the insulator, allowing the bottom of the insulator to be covered by the insulating material, for superior heat retention in the nozzle tip.

FIGS. 6b', 6b'', 6b''', 6b'''' are plan and [FIG. 6b is a] cross-sectional views detailing the construction of the inner piece according the Valve Gate version of the preferred embodiment. FIGS. 6b', 6b'', 6b''', 6b'''' also illustrate the slots 63 cut through the upper wall of the inner piece 65. The slots are absent between "A" and "B" in the plan view and their opposite counterparts (not shown), so that there are two slots in the inner piece, each having an equal length on opposing sides. FIG. 6c shows the outer piece detail. It is "snapped" over the inner piece 65 so that shoulder 69 deflects over corresponding shoulder 68 on the inner piece 65 shown in FIG. 6b.

Alternate styles of retaining clips to be used with the preferred third embodiment shown in FIG. 5a and the alternate preferred embodiment of FIG. 6a are shown in FIGS. 7a–7c, 8a–4c, and 9a–9c. 7a–7c is a flat stamping retaining clip, 8a–8c is a retaining clip formed of wire having a circular cross-section, and 9a–9c is a retaining clip formed of wire of square cross-section. All of the retaining clips are made of spring steel, stainless steel or other suitable material that retains its resilience when subjected to elevated temperatures in the range of 450–700° F. The retaining clips may have any shape that allows them to removably engage the groove or slot common to both the insulator and the nozzle tip.

FIGS. 10a–10b, 11a–11c, 12a–12c, and 13a–13e show other additional embodiments for attaching the insulator assembly to the nozzle tip. The insulator may consist of an inner and an outer piece, or it may have a unitary construction. If the insulator has two pieces, the inner piece is a conductive material capable of withstanding high temperatures without deforming, cracking, or otherwise deteriorating. The preferred material for the inner piece may be, or include, titanium. The corresponding outer piece is then an insulating material that is also capable of withstanding high temperatures without deforming, cracking, or otherwise deteriorating. The preferred material for the outer piece may be, or include, Vespel. A one-piece insulator should be constructed of or include an elastic, heat-resistant material such as Vespel, such that the insulator has the same external dimensions as the inner piece and outer piece combination it replaces.

For those embodiments where use of assembly and disassembly tools may be beneficial, the assembly and disassembly tools are preferably made of a material or materials that can be constructed to correspond to the dimensions of the nozzle tip and insulator while remaining strong and durable for repeated use in attaching and removing insulators to and from tips that may or may not be at an elevated temperature. Such materials may include, but are not limited to, metals (such as steel), plastics, fiberglasses, and ceramics.

FIGS. 10a–10b show a fourth "Set Screw" embodiment in which the insulator 100 is attached to a nozzle tip 102 by means of one or more set screws 101. FIG. 10a shows that the insulator 100 has one or more pre-formed openings 103 with threads corresponding to the set screws 101, and the nozzle tip 102 has one or more threaded openings 104 corresponding to the openings 103 on the insulator. The screws are threaded into the openings in the insulator and nozzle tip, thereby causing the insulator to be removably attached to the nozzle tip.

FIG. 10b shows a socket driver 105 having an opening 106 that is specially adapted for grasping the set screws 101 and threading them into the threaded openings 103 and 104 of the insulator 100 and nozzle tip 102, respectively.

FIGS. 11a–11c show a fifth "Bayonet" embodiment in which a locking feature 110 in the insulator 112 engages a corresponding tab 111 on the tip 113 when placed on the nozzle tip and twisted. The locking feature in the insulator and the tab on the tip would be formed by machining the parts, allowing for the use of different tab and locking groove configurations. The only limitation on the configurations of the tabs and locking grooves, which may have a variety of shapes, is that they must be capable of being securely fastened together to releasably and removably attach the insulator to the tip. Preferably, the tab and locking groove would be designed so that it is unlikely that the insulator could rotate and disengage from the tip during the injection molding process.

Figure 2A:
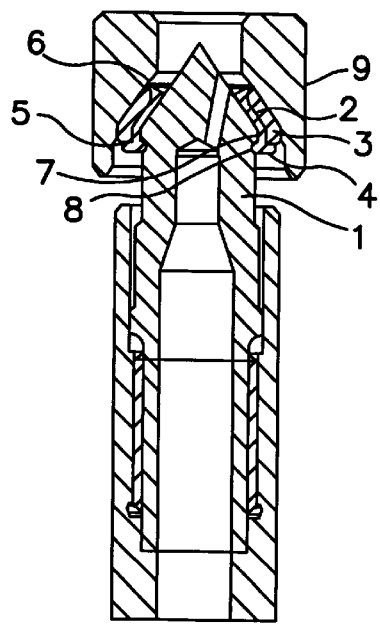
FIG. 2a is a cross-sectional view of a "Snap On" insulator assembly tool including a nozzle tip insulated by an insulator.
Figure 2B:
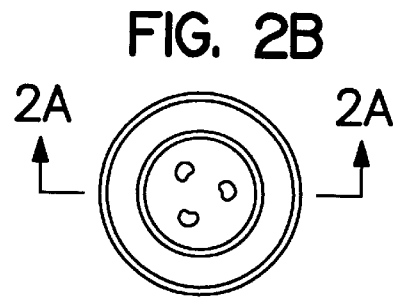
FIGS. 2b–2d are three-dimensional views of the nozzle tip and attached insulator and assembly tool.
Figure 2C:
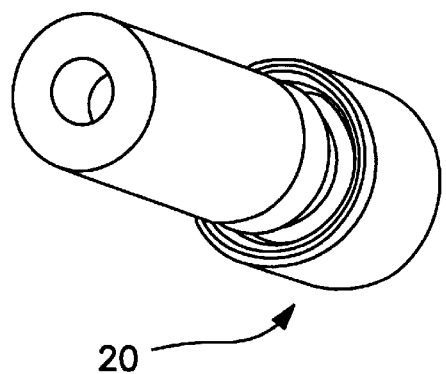
Figure 2D:
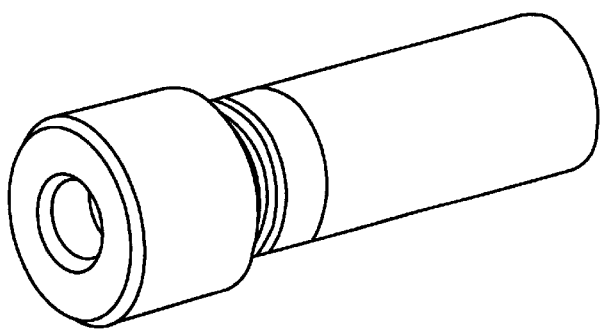
Figure 3A:
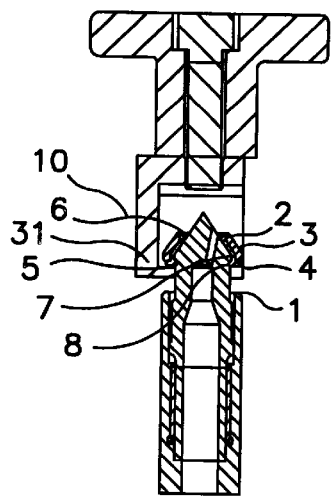
FIG. 3a is a cross-sectional view of a "Snap On" insulator removal tool including a nozzle tip insulated by an insulator.
Figure 3B:
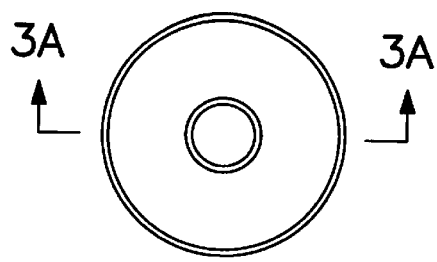
FIGS. 3b–3d are three-dimensional views of the nozzle tip and attached insulator and removal tool.
Figure 3C:
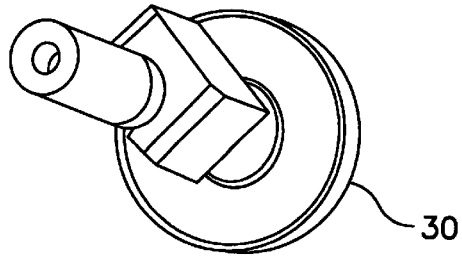
Figure 3D:
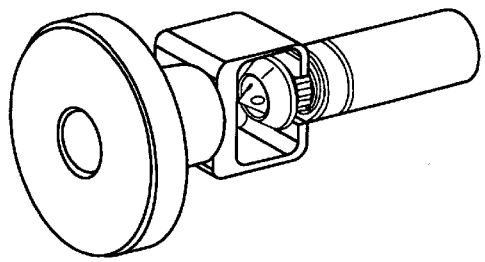
Figure 4A:
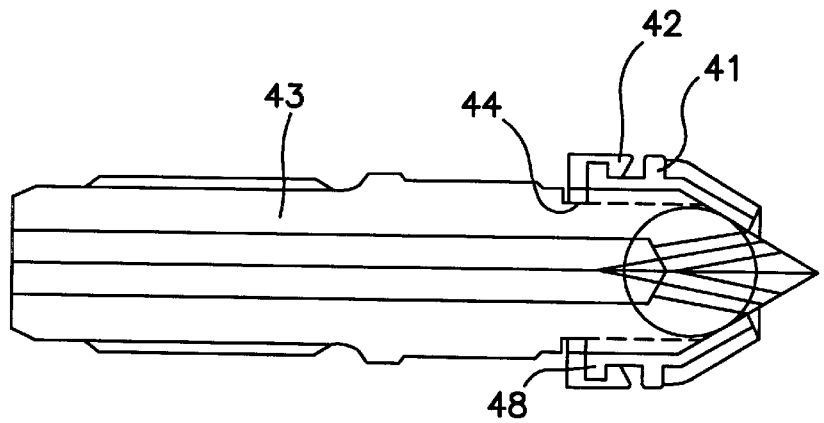
FIGS. 4a–4d are cross-sectional views of an insulator assembly with retaining clip version "A".
Figure 4B:
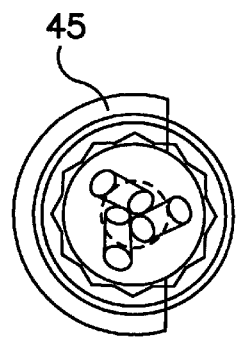
Figure 4C:
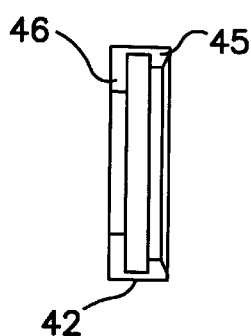
Figure 4D:
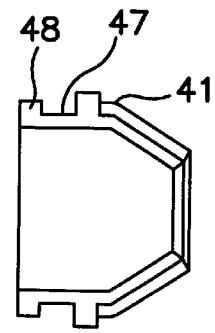

The insulator may be installed and removed manually or with assembly and disassembly tools similar to those shown in FIGS. 2a and 3a. Such an assembly tool would be capable of securely holding the insulator while allowing the user to twist the insulator onto the nozzle tip until the locking feature 110 has fully engaged the tab 111 on the nozzle tip. A suitable removal tool would be capable of securely holding the insulator while allowing the user to twist the insulator off of the nozzle tip by disengaging the locking feature 110 from the tab 111.

FIGS. 12a–12c show a sixth "Thread and Flats" embodiment in which an insulator 120 has threads 123 on its inner surface and is threaded onto the tip 121 that has threads 124 on its outer surface corresponding to the threads 123 on the inner surface of the insulator. The insulator 120 may be further tightened onto the nozzle tip 121 by means of wrench flats 122.

FIGS. 13a–13e show a seventh "Snap Ring" embodiment in which the insulator 130 has an internal groove 131 for retaining a snap ring 134. The snap ring 134 then engages a corresponding groove 132 in the tip 133 when the insulator is pushed onto the tip, thus causing the insulator to become releasably attached to the tip. The snap ring may comprise any material capable of retaining its resilience when subjected to elevated temperatures in the range of 450–700° F., such as spring steel or stainless steel. The snap ring and grooves in the insulator and tip have corresponding shapes to allow the best possible fit, but there are no limitations on the particular shape chosen.

The insulator may be installed and removed manually or with assembly and disassembly tools similar to those shown in FIGS. 2a and 3a. Such an assembly tool would be capable of securely holding the insulator while allowing the user to push the insulator onto the nozzle tip until the snap ring 134 is securely positioned in the groove 132 on the nozzle tip 133. A suitable removal tool would be capable of securely holding the insulator while allowing the user to pull the insulator off of the nozzle tip, thereby disengaging the snap ring 134 from the groove 132 on the nozzle tip 133 and the internal groove 131 of the insulator 130.

While the present invention has been described for what are presently considered the preferred embodiments, the invention is not so limited. To the contrary, the invention is intended to cover various modifications and equivalent arrangements included within the spirit and scope or the appended claims. The scope of the following claims is to be accorded the broadest interpretation so as to encompass all such modifications and equivalent structures and functions.

We claim:

1. A fastening device for removably attaching an insulator to an outside of an injection molding nozzle tip, comprising:
   engaging structure in said nozzle tip; and
   fastening structure removably coupleable to said engaging structure, for removably coupling the insulator to the outside of the nozzle tip, said fastening structure directly contacting both the insulator and the nozzle tip.

2. The device of claim 1, wherein said fastening structure comprises a retaining clip that fits into said nozzle tip engaging structure and an opening in said insulator.

3. The device of claim 1, wherein said fastening structure comprises an opening in said insulator that corresponds to a protruding engaging structure of said nozzle tip.

4. The device of claim 3, wherein said fastening structure is attached by placing the insulator on the nozzle tip and then rotating the insulator until the opening in the insulator covers the protruding portion of the nozzle tip.

5. The device of claim 1, wherein said fastening structure comprises an opening in said nozzle tip that corresponds to a protruding engaging structure of said insulator.

6. The device of claim 5, wherein said fastening structure is attached by placing the insulator on the nozzle tip and then rotating the insulator until the protruding portion of the insulator covers the opening in the nozzle tip.

7. The device of claim 1, wherein said fastening structure comprises a snap ring which engages a groove in the insulator device, and the engaging structure of the nozzle tip.

8. The device of claim 1, wherein said insulator comprises a one-piece insulator.

9. A fasting device for removably attaching an insulator to an injection molding nozzle tip, comprising:
   engaging structure in said nozzle tip; and
   fasting structure removably coupling to said engaging structure, for removable coupling the insulator to the nozzle tip, wherein said fastening structure comprises one or more set screws, and wherein the one or more set screws fit into said nozzle tip engaging structure and an opening in said insulator.

10. A fastening device for removably attaching an insulator to an injection molding nozzle tip, comprising:
    engaging structure in said nozzle tip; and
    fastening structure removably coupleable to said engaging structure, for removably coupling the insulator to the nozzle tip, wherein said fastening structure and said engaging structure comprise corresponding threads, further comprising wrench flats on the insulator.

11. A fastening device for removably attaching an insulator to an injection molding nozzle tip, comprising:
    engaging structure in said nozzle tip; and
    fastening structure removably coupleable to said engaging structure, for removably coupling the insulator to the nozzle tip, wherein said insulator comprises a two layer insulator, and wherein said insulator has an inner portion that is more conductive than an outer layer.

12. An insulator device for an injection molding nozzle tip, comprising:
    an insulator, disposed on an outside of the nozzle tip, for thermally insulating the nozzle tip; and
    coupling structure for removably attaching the insulator to the outside of said nozzle tip, said coupling structure being in direct contact with both the nozzle tip and the insulator.

13. The device of claim 12, wherein said coupling structure comprises an opening in said insulator that corresponds to a protruding portion of said nozzle tip.

14. The device of claim 13, wherein said insulator is attached to said nozzle tip by placing the insulator on the nozzle tip and then rotating the insulator until the opening in the insulator covers the protruding portion of the nozzle tip.

15. The device of claim 12, wherein said coupling structure comprises an opening in said nozzle tip that corresponds to a protruding portion of said insulator.

16. The device of claim 15, wherein said insulator is attached to said nozzle tip by placing the insulator on the nozzle tip and then rotating the insulator until the opening in the nozzle tip covers the protruding portion of the insulator.

17. The device of claim 12, wherein said coupling structure comprises threads on said insulator and corresponding threads on said nozzle tip.

18. The device of claim 17, wherein the insulator outer surface includes wrench flats.

19. An insulator device for an injection molding nozzle tip, comprising:
    an insulator for thermally insulating the nozzle tip; and
    coupling structure for removably attaching the insulator to said nozzle tip, wherein said coupling structure comprises a retaining clip that fits into a corresponding opening in said nozzle tip and a corresponding opening in said insulator.

20. An insulator device for an injection molding nozzle tip, comprising:
    an insulator for thermally insulating the nozzle tip; and
    coupling structure for removably attaching the insulator to said nozzle tip, wherein said coupling structure comprises one or more set screws, and wherein the one or more set screws fit into one or more corresponding openings in said nozzle tip and one or more corresponding openings in said insulator device.

21. An insulator device for an injection molding nozzle tip, comprising:
    an insulator for thermally insulating the nozzle tip; and
    coupling structure for removably attaching the insulator to said nozzle tip, wherein said coupling structure comprises a movable flange on said insulator and a corresponding detent on the nozzle tip.

22. An insulator device for an injection molding nozzle tip, comprising:
    an insulator for thermally insulating the nozzle tip; and
    coupling structure for removably attaching the insulator to said nozzle tip, wherein said coupling structure comprises an internal snap ring disposed between the insulator and the nozzle tip, wherein the snap ring fits into a groove in the nozzle tip and a groove in said insulator.

23. An injection molding device comprising:
    a mold having an opening; and
    nozzle assembly for contacting the opening, said nozzle assembly comprising:
    a nozzle tip through which molten material passes; and
    a nozzle tip insulator, disposed on an outside of the nozzle tip, for thermally insulating the nozzle tip, said insulator having coupling structure for removably coupling the insulator to the outside of said nozzle tip, said coupling structure directly contacting both the nozzle tip and the insulator.

24. An extension between machine injection units in an injection molding device, comprising:

a first hot runner injection unit connected to a second hot runner injection unit; and a nozzle assembly on said first hot runner injection unit for contacting said second hot runner injection unit, said nozzle assembly comprising:

a nozzle tip through which molten material passes; and a nozzle tip insulator, disposed on an outside of the nozzle tip, for thermally insulating the nozzle tip, said insulator having coupling structure for removably coupling the insulator to the outside of said nozzle tip, said coupling structure directly contacting both the nozzle tip and the insulator.

25. An inlet to a mold hot runner in an injection molding device, comprising:

a heating channel for heating materials to be used in injection molding; and a nozzle assembly for conveying said materials to be used in injection molding into said heating channel to be heated, said nozzle assembly comprising:

a nozzle tip through which said materials pass; and a nozzle tip insulator, disposed on an outside of the nozzle tip, for thermally insulating the nozzle tip, said insulator having coupling structure for removably coupling the insulator to the outside of said nozzle tip, said coupling structure directly contacting both the nozzle tip and the insulator.

\* \* \* \* \*